Oct. 1, 1957     J. J. FRYER ET AL     2,807,877
RUBBER TIRE TRIMMING TOOL
Filed June 2, 1955
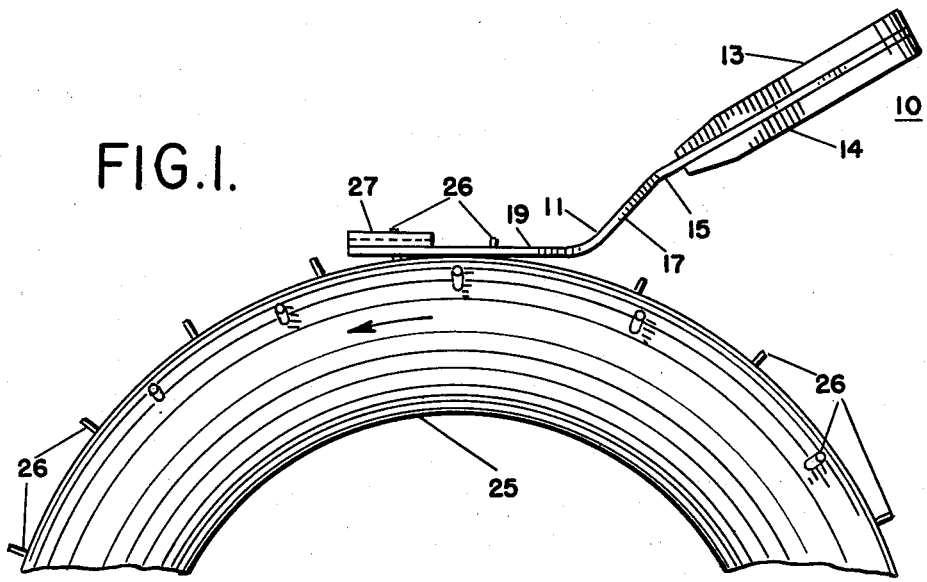
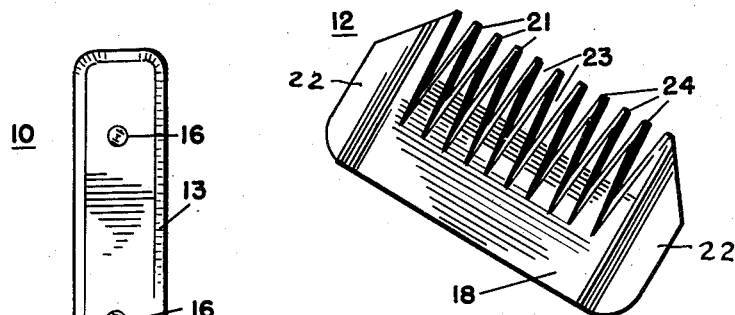
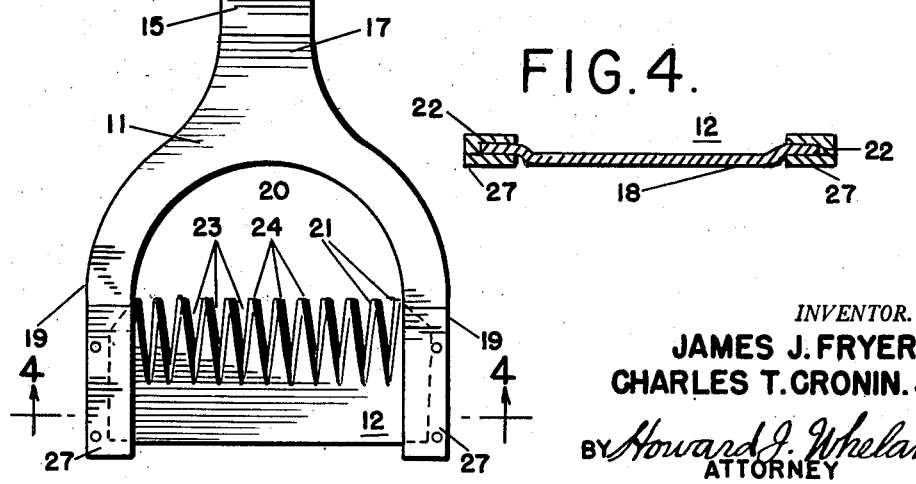
INVENTOR.
JAMES J. FRYER.
CHARLES T. CRONIN. Jr.
BY Howard J. Whelan.
ATTORNEY

United States Patent Office 2,807,877
Patented Oct. 1, 1957

2,807,877

RUBBER TIRE TRIMMING TOOL

James J. Fryer and Charles T. Cronin, Jr., Baltimore, Md.

Application June 2, 1955, Serial No. 512,748

2 Claims. (Cl. 30—280)

This invention relates to the manufacture of rubber and rubberlike pneumatic and solid tires used on vehicles, and more particularly to the flexible rubberlike spikes or ridges remaining on the peripheries and side walls of the tires after they have been removed from the mold.

In the process of manufacturing tires made from rubber and various plastics or synthetic compositions, molds are employed to form and complete the tire. Heat and pressure are employed to integrate the pliant rubber or plastic composition on the fabric carcass. The mold for producing a tire is arranged with multitudinous pores into which the composition insinuates itself, forming comparatively short flexible spikes of rubber extending radially out beyond the periphery and side walls of the finished tire. These spikes are created by the excess rubber flowing from the tire into holes in the mold designed to relieve the air so it can be exhausted from the mold. This eliminates the possibility of air bubbles in the tire as well as too much pressure in the mold if the rubber fill is more than it should be. The term "spikes" is arbitrarily used to designate them herein. The tires are put on the commercial market without these spikes projecting from them. It is considered more desirable to remove these spikes, if it is convenient to do so. It is customary to employ a razor sharp knife for the purpose in the hand of an operator, who at times is unskilled in this type of work. He does not often do a uniform job, and may even cut into the tire tread itself and seriously damage it. Such a cut can be inconspicuous because the resiliency of the rubber closes it up, a fact that can cause an undue sense of security. It is however there and, while the wheel tired with it, is run over the usual terrain, the cut opens and closes at every revolution. In time this makes the cut larger and induces the final collapse of the tire. This invention anticipates this situation and overcomes the difficulty by providing a special tool, easily held against the periphery of the tire, as the latter is rotated. It is preferably manipulated and held in the hand. The tool has a deep throated blade with teeth set close together, having long sharpened edges in V-form relation. This blade catches the spikes in between the edges of its teeth and converges on them. This snips or cuts them off and carries them off the blade and tire. When the blade becomes worn and dull, it is removed from its handle and replaced by another. While tires for vehicles are commonly of rubber, other plastics have been developed as substitutes, and are to be understood as included in this description, when rubber is referred to.

Among the objects of this invention is that which provides for a new and improved trimmer or remover of molding spikes projecting from the periphery of a pneumatic or solid tire that will avoid one or more of the disadvantages and limitations of the previous art.

Another object of the invention is to provide a new and improved spike trimmer and remover for plastic tires that will be relatively compact, light and economical to manufacture.

A further object of this invention is to provide a new and improved trimmer or remover of molding spikes on tires of rubberlike composition that will be effective and easily handled and operated.

An additional object of the invention is to provide a new and improved hand tool for removing molding spikes readily and expeditiously, without involving danger or requiring unusual skill on the part of the operator.

Still another object of this invention is to provide a new and improved trimmer for the removal of molding spikes, that is safe, quick, effective and neat in results.

Other objects of the invention will become apparent as it is more fully explained both as to construction and use.

Reference is made to the accompanying drawings, to make the invention appreciated. One form of the invention is shown as an example, with the following description explaining its principles and details of its construction.

In the drawings:

Figure 1 is a side elevation of a spike trimming tool embodying this invention shown in connection with a portion of tire with extending molding spikes, to indicate the manner in which it is employed;

Figure 2 is a plan view of this embodiment;

Figure 3 is a detail in plan of the knife blade used in this embodiment, and

Figure 4 is a sectional view taken transversely on line 4—4 of Figure 2, to show the method holding the removable blade.

The same reference numbers refer to the same parts throughout the drawings.

In the construction of this invention, in the form illustrated, there are three main parts. These consist of a handle or support 10, a blade holder 11, and a removable blade 12. The handle is of conventional form made suitable for manual operation. It has upper and lower plates 13 and 14 respectively, which sandwich a flat metal stem 15 in between them. The plates 13 and 14 are symmetrical and preferably made of wood, plastic or other suitable insulating and attractive material. Screws or rivets 16 attach the plates and stem together. The plates are bevelled at their longitudinal edges and rounded at the end. The stem 15 extends beyond the plates and is bent to an offset or extension 17 of about 45° and 50° completing its formation with a U-like holder 11. The holder 11 is likewise flat and its arms 19 made long enough to provide an open area 20 in between. This area is closed-in across the ends of the arms 19 by the removable blade 12 having its sharpened cutting edges 21 facing towards the handle. The blade is slidably and removably attached to the arms 19 by slotted members 27 so it may be readily replaced. The blade has its series of cutting edges 21 formed on apexed teeth 24, more closely converging and considerably longer than conventional saw teeth. The members 27 are flat pieces mounted on the bottom of the arms 19 to encase the off-set side portions 22 of the blade 12. These converging teeth are intended to admit the molding spikes 26 of a rotating automobile tire 25 or the like, when the tool is laid against its sides and periphery where they are located. The spikes 26 are drawn in between the teeth and sheared off as the sharpened converging edges 21 engage them in their narrowing valleys 23 between them. The tool is moved across the periphery of the tire to catch any spikes that are left and remove them. When the blade becomes dull, it is slipped out of the holder 11 and replaced with a new and newly sharpened one to continue the work on other tires brought in for spike removal. The knife blade 12 is designed with its off set side portions 22 slidable in slots formed between the pieces 27 and the arms 19, as indicated. The ends of the arms block the blade against movement out of the handle. The tire is rotated in a direction away from the operator or the holding means, so the spikes will be drawn into the jaws of the teeth, while the trimming tool is held stationary. While the tool indicated is made for hand operation, it could be held stationary or semi-stationary if preferred and the conditions warrant it without changing its structure appreciably. The type of teeth used on this tool offer a positive method of trimming off the spikes and do so neatly and without digging into the tire. The hand tool can be made inexpensively, and having very few parts will not get out of order. The use of a slip-on arrangement for the blade enables changes thereof to be made quickly and without much effort, yet while in use, it is held sturdily. The handle is insulated by the plates 13 and 14 to prevent shocks from static electricity. The offset 17 permits the knife 12 to be positioned without danger of the hand of the operator being contacted by the rotating tire. The tool is so effective that it can be employed to remove all the spikes of a tire and accomplish this within a very short space of time. Where a large number of tires are to be trimmed in this manner, the progress of doing this work is remarkably short. The blade is depressed along its middle portion 18 at the plane of the teeth to bring it flush with the underside of the U-shaped holder and thus bring it closer to the bottom of the spikes while trimming them.

In Figure 1, the direction of rotation of the tire 25 to be trimmed is indicated by an arrow, with respect to the spike trimming tool. The tire has spikes 26 projecting from it in a more or less conventional manner from the walls of the tire as is customary. The tool is positioned tangentially to the tire in some instances, and flat against the side walls in others, depending on the location of the particular spikes to be trimmed off.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A tool for cutting molding spikes from a tire after the latter is removed from a mold; said tool comprising a handle including a metallic element enlarged at one end and formed to provide a bifurcation at said enlarged end, a blade, and means removably holding said blade in said bifurcation, said blade in the intermediate portion thereof being flat and serrated at one edge of said flat portion to provide sharp pointed teeth projecting inwardly of said bifurcation and said teeth having sharpened edges near their roots to cut the spikes.

2. A tool of the type set forth in claim 1, in which said metallic element has a grip portion connected to said enlarged end by an intermediate portion projecting from said enlarged end at an angle thereto.

References Cited in the file of this patent

UNITED STATES PATENTS

| | | |
|---|---|---|
| 1,156,652 | Aiken | Oct. 12, 1915 |
| 1,174,932 | Grenier | Mar. 7, 1916 |
| 2,352,013 | Roth | June 20, 1944 |
| 2,503,961 | Meunier | Apr. 11, 1950 |

FOREIGN PATENTS

| | | |
|---|---|---|
| 260,090 | Great Britain | Oct. 28, 1926 |